United States Patent

Taguchi

[11] Patent Number: 6,052,577
[45] Date of Patent: Apr. 18, 2000

[54] PORTABLE TELEPHONE USE LIMITING SYSTEM AND PORTABLE TELEPHONE

[75] Inventor: Masayuki Taguchi, Tokyo, Japan

[73] Assignee: NEC Corporation, Tokyo, Japan

[21] Appl. No.: 08/851,455

[22] Filed: May 5, 1997

[30] Foreign Application Priority Data

Jun. 7, 1996 [JP] Japan .................................. 8-168265

[51] Int. Cl.[7] .................................................. H04B 1/06
[52] U.S. Cl. .......................... 455/411; 455/457; 455/566; 455/26.1; 455/528
[58] Field of Search ...................... 455/456, 457, 455/410, 411, 412, 421, 117, 422, 566, 26.1, 528, 517

[56] References Cited

U.S. PATENT DOCUMENTS

| | | | |
|---|---|---|---|
| 5,535,431 | 7/1996 | Grube et al. | 455/456 X |
| 5,802,445 | 9/1998 | Wiedeman et al. | 455/117 X |
| 5,819,171 | 10/1998 | Hoogerwerf et al. | 455/411 X |
| 5,832,386 | 11/1998 | Nojima et al. | 455/421 X |
| 5,835,857 | 11/1998 | Otten | 455/456 X |

FOREIGN PATENT DOCUMENTS

| | | |
|---|---|---|
| 63-120533 | 5/1988 | Japan . |
| 4-111699 | 4/1992 | Japan . |
| 514489 | 1/1993 | Japan . |
| 7-87568 | 3/1995 | Japan . |
| 7-245782 | 9/1995 | Japan . |
| 7-264671 | 10/1995 | Japan . |

*Primary Examiner*—Welling Chin
*Assistant Examiner*—Philip J. Sobutka
*Attorney, Agent, or Firm*—Sughrue, Mion, Zinn, Macpeak & Seas, PLLC

[57] ABSTRACT

A mobile station use limiting system includes a base station provided in a cell and connected to a public telephone network, a use limiting station provided in the cell, for transmitting a use limitation signal. A mobile station can perform communication with the base station via an electromagnetic wave. The communication with the base station is limited in the mobile station in response to the use limitation signal.

20 Claims, 3 Drawing Sheets

PORTABLE TELEPHONE USE LIMITING SYSTEM AND PORTABLE TELEPHONE

BACKGROUND OF THE INVENTION

1. Field of the Invention

The present invention relates to a portable telephone system and a portable telephone, and more particularly to a portable telephone system which is composed of a base station connected to a public telephone network, and a portable telephone as a mobile station connectable to the base station by a radio frequency channel, and in which communication between the base station and the portable telephone is limited to a specific area.

2. Description of Related Art

Conventionally, in a portable telephone system, the service area of a plurality of base stations which are connected to a public telephone network is totally predetermined based on all factors such as geography, electromagnetic wave transmission characteristic, a traffic quantity, and communication quality. The plurality of base stations are installed such that the service area can be sufficiently covered. Here, an area which can be covered by one base station is referred to a "cell". The line design is performed in such a manner that it is possible to transmit a call from the portable telephone to the base station or to receive a call from the base station to the portable telephone, if the portable telephone as the mobile station is within the cell.

Here, the base station and the portable telephone as a mobile station have the transmission output of several watts such that a radio frequency channel can be mutually established even when the mobile station is located in a building, a car, and a train in addition to outdoors.

However, in the above-mentioned conventional portable telephone system, there is a problem in public use of the portable telephone, for example, in users anywhere communicate aloud using portable telephones, as the number of portable telephones rapidly increases. Also, this electromagnetic wave transmission output of several watts sometimes causes an erroneous operation of electronic equipment when the portable telephone is used nearby the electronic equipment. For example, there has been recently reported an accident in which a heart pump of a patient stopped when the portable telephone is used in a hospital. For this reason, hospitals prohibit use of portable telephones in the hospitals or bringing of the portable telephone into the hospitals.

In Japanese Laid Open Patent Disclosure (JP-A-Heisei 5-14489), it is described that use of a portable telephone is limited as a reception or transmission only unit during a specific time zone. However, in this convention example, it is impossible to limit the use of the portable telephone in a public place such as a hospital.

SUMMARY OF THE INVENTION

Therefore, the present invention is accomplished in the light of the above-mentioned circumstances. An object of the present invention is to provide a portable telephone use prohibiting/limiting system and a portable telephone in which an erroneous operation of an electronic equipment due to the high output electromagnetic wave outputted from the portable telephone can be reliably prevented within a specific area and the use of the portable telephone can be limited in a public place.

In order to achieve an aspect of the present invention, a mobile station use limiting system includes a base station provided in a cell and connected to a public telephone network, a use limiting station provided in the cell, for transmitting a use limitation signal, and a mobile station capable of communication with the base station with electromagnetic wave, wherein the communication with the base station is limited in the mobile station in response to the use limitation signal.

The mobile station includes a communication section for communicating with the base station, a receiving section for receiving the use limitation signal from the use limiting station, and a control section for controlling the communication section in response to the reception of the use limitation signal to prohibit the communication with the base station. When the mobile station further comprises a display section, the control section may include a message storing section for storing a message indicating that the mobile station is in a communication prohibited area where the use limitation signal can be received, and a section for displaying the message on the display section in response to the reception of the use limitation signal.

In addition, the control section may include a first section which responds to the reception of the use limitation signal to control the communication section to issue to the base station a reception limitation notice indicating that the mobile station is in a communication prohibited area where the use limitation signal can be received. In this case, the base station stops relay of a call to the mobile station in response to the reception limitation notice.

Also, the control section may include a second section which responds to no reception of the use limitation signal to control the communication section to issue to the base station a reception enable notice indicating that the mobile station is out of the communication prohibited area, when the use limitation signal is not received after the use limitation signal is once received.

Also, in order to achieve another aspect of the present invention, a portable telephone includes a communication section for communicating with an external apparatus with electromagnetic wave, a receiving section for externally receiving a use limitation signal, a control section for controlling the communication section in response to the reception of the use limitation signal to prohibit the communication with the external apparatus.

In addition, in order to achieve still another aspect of the present invention, a communication control method in a mobile station use limiting system comprising the step of:

transmitting a use limitation signal from a use limiting station which is provided in a cell;

allowing communicating between a base station and a mobile station while the mobile station is not in a use limitation area where the use limitation signal can be received by the mobile station, the base station covering the cell;

prohibiting the communication between the mobile station and the base station while the mobile station is in the use limitation area.

DESCRIPTION OF THE PREFERRED EMBODIMENTS

A portable telephone use limiting system of the present invention will be described with reference to the drawings.

Figure 1:
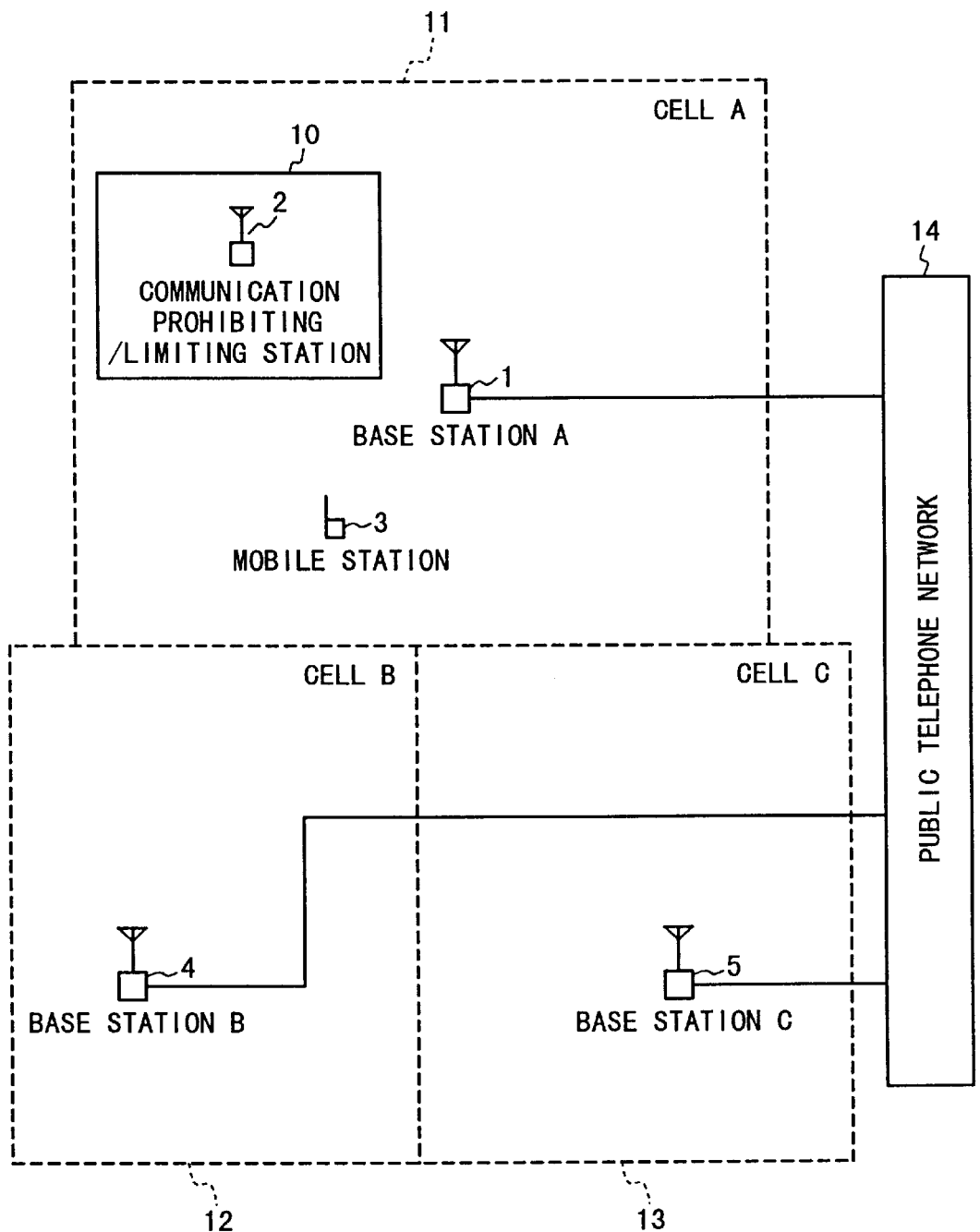
FIG. 1 is an arrangement diagram illustrating a portable telephone use limiting system according to an embodiment of the present invention.

FIG. 1 is an arrangement diagram illustrating the portable telephone use limiting system according to an embodiment of the present invention. Referring to FIG. 1, the portable telephone use limiting system is composed of a plurality of base stations, such as a base station (A) 1 covering a cell area (A) 11, a base station (B) 4 covering a cell area (B) 12, and a base station (C) 5 covering a cell area (C) 13. The base stations 11, 12 and 13 are connected to a public telephone network 14. A communication prohibiting/limiting station 2 is provided in the cell area (A) 11 such that an area 10 is set as a communication limitation area 10 where use of a portable telephone 3 as a mobile station is limited.

Figure 2:
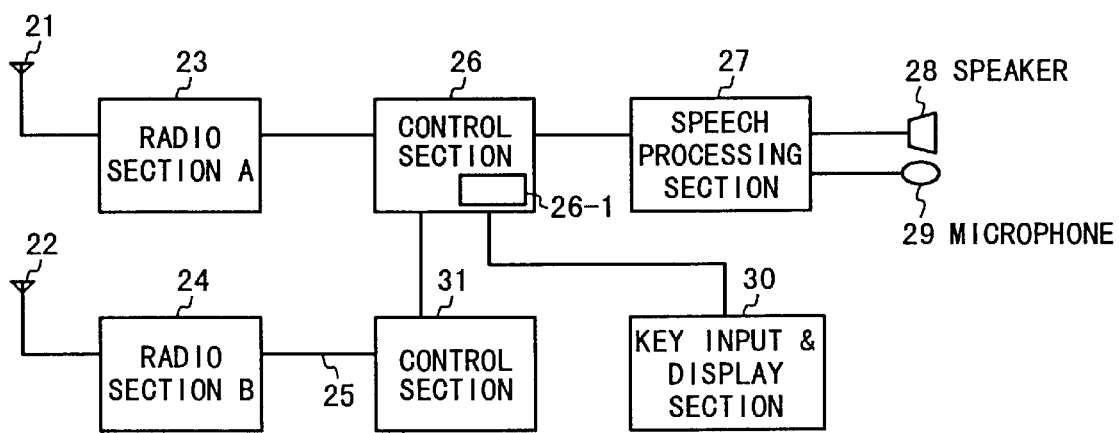
FIG. 2 is a block diagram illustrating the structure of a portable telephone used in the portable telephone use limiting system according to the embodiment of the present invention.

FIG. 2 is a block diagram illustrating the structure of the portable telephone 3 as the mobile station in the embodiment of the present invention. Referring to FIG. 2, the portable telephone 3 in the embodiment of the present invention is composed of an antenna 21, a radio section (A) 23, a control unit 26, a speech processing section 27, a speaker 28, a microphone 29, and a key input and display section 30 as the structure to realize a normal communication function. Also, the portable telephone 3 is further composed of an antenna 22, a radio section (B) 24, and a control section 31 as the structure for receiving a use limitation signal. In addition, the control section 26 has a message storing section 26-1 which stores predetermined messages.

It is assumed that the mobile station 3 is now outside of the use limitation area 10 so that the mobile station 3 is in the state in which normal communication with the base station 1 is allowed.

In case of the normal communication, e.g., reception of a call, a signal which is received by the antenna 21 is demodulated by the radio section (A) 23 and is separated into a control signal and a speech signal by the control unit 26. A counter telephone number and so on are displayed by the key input and display section 30 based on the control signal. Also, the speech signal is processed by the speech processing section 27 and outputted from the speaker 28 in an audio manner.

In case of transmission of a call, a telephone number and so on is inputted from the key input and display section 30 and supplied to the control section 26. A speech signal is inputted from the microphone 29, processed by the speech processing section 27 and supplied to the control section 26. The control section 26 transmits the telephone number, the speech signal, a control signal and the like to the base station via the radio section (A) 23 and the antenna 21.

When this mobile station 3 enters the inside of the use limitation area 10, the mobile station 3 receives the use limitation signal which is sent out from the communication prohibiting/limiting station 2 so that the transmission and reception of a new call is limited. Because the use limitation signal which is sent out from the communication prohibiting/limiting station 2 is sufficient to cover a limited narrow area, the power of the use limitation signal outputted from the communication prohibiting/limiting station 2 is smaller than the electromagnetic wave transmission output used for communication between the base station 1 and the mobile station 3. For example, if a small power electromagnetic wave in the VHF or FM band is used as the electromagnetic wave of the use limitation signal while the transmission output of the portable telephone 3 is in a range of 1 to 5 watts (W) in the 800 MHz band at present, a square area of 100 m can be covered with the transmission output of several milliwatts (mW). Note that the use limitation signal is not limited to electromagnetic wave but may be infrared light.

When the use limitation signal sent out from the communication prohibiting/limiting station 2 is received by the antenna 22, the use limitation signal is demodulated into a control signal 25 of a high level in an active state by the radio section (B) 24. The control section 31 always monitors the control signal 25 to determine whether or not the portable telephone 3 is located in the use limitation area 10 at present. When the control signal 25 is in the high level, i.e., the portable telephone is positioned within the use limitation area 10, the control section 31 issues a communication limit signal to the control section 26 such that a notice indicating that the portable telephone 3 is positioned in the use limitation area 10 is issued to the base station and it is displayed on the key input and display section 30 that the portable telephone 3 is positioned in the use limitation area 10.

Figure 3:
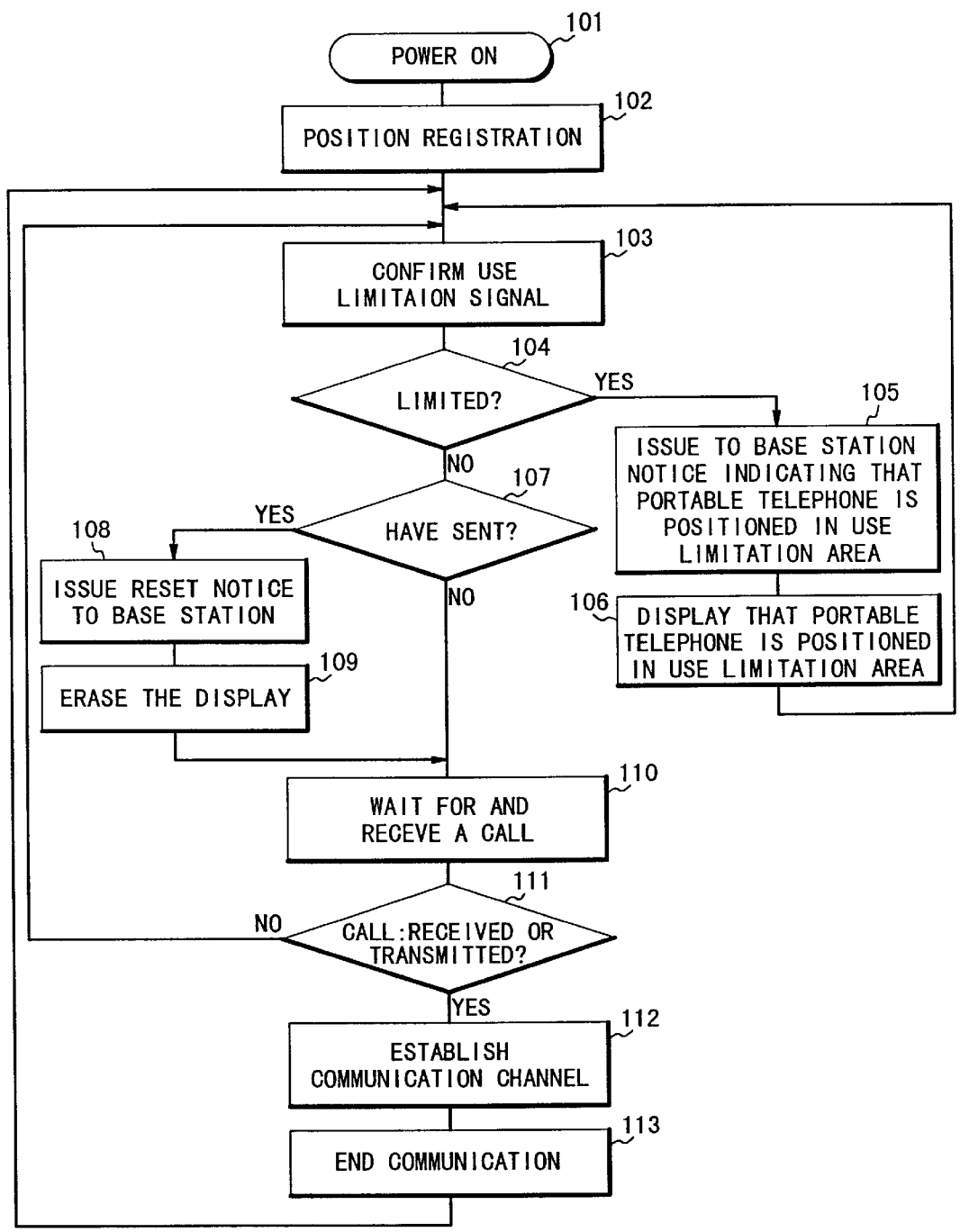
FIG. 3 is a flow chart illustrating an operation of the portable telephone according to the embodiment of the present invention.

Next, operation of the portable telephone in the portable telephone use limiting system according to the embodiment of the present invention will be described below. FIG. 3 is a flow chart illustrating an operation of the portable telephone according to the embodiment of the present invention.

Referring to FIG. 3, after the power is turned on (step 101), a position registering process (step 102) is normally executed. Then, the control goes to a step 103. In the step 103, the control section 31 performs the confirmation processing of the use limitation signal. In the step 103, in order to see whether or not the use of the portable telephone 3 is limited, the control signal 25 which is received by the antenna 22 and demodulated by the radio section (B) 24 is confirmed to see whether or not the control signal is in the high level.

When it is determined by the control section 31 in the step 104 that communication is limited, the control section 31 issues the communication limit signal to the control section 26. In a step 105, the control section 26 reads a predetermined message indicating that the portable telephone 3 is positioned within the use limitation area 10, from the message storing section 26-1 in response to the communication limit signal. The read message is transmitted to the base station 1 via the radio section (A) 23 and the antenna 21, as in the transmission of a call. At the same time, in a step 106, the control section 26 control the key input and display section 30 to display the message indicating that the portable telephone 3 is outside of the service area, i.e., within the use limitation area 10. Then, the control returns to the processing of step 103.

When receiving a call at the portable telephone 3 via the public telephone network 14 after the limitation use message is received, the base station 1 with replies a message indicating that communication with the portable telephone 3 can not be performed.

On the other hand, when it is determined in the step 104 that the communication is not limited, the control goes to a step 107. In the step 107, it is determined whether the message is displayed on the key input and display section 30. The display of the message means that the message has been sent to the base station 1. When the message is displayed, in a step 108, the control section 26 reads a message indicating that the portable telephone 3 is outside of the use limitation area 10, from the message storing section 261, and transmits to the base station 1 via the radio section (A) 23 and the antenna 21, such that a call to the portable telephone 3 via the public telephone network 14 can be relayed by the base station 1. At the same time, in a step 109, the control section 26 erases the message display. When the message is not displayed, no operation is performed. Then, the control goes to a step 110.

In the step 110, it is determined whether or not a call is received by the portable telephone 3 or whether or not a call is transmitted to the base station 1. It is determined in a step 111 that no call is received or transmitted, the control goes to the step 103. When it is determined in the step 111 that a call is received or transmitted, a communication channel is established in a step 112. Thus, the communication can be performed. After a communication end process is ended (step 113), the control returns to the step 103.

As described above, according to the present invention, because the use limitation signal is sent out by the communication prohibiting/limiting station 2 to have a minimum output electromagnetic wave power. Accordingly, the transmission of the electromagnetic wave from the portable telephone 3 having the large output power can be prohibited in the area where the electromagnetic wave of the use limitation signal reaches. Thus, the influence of the electromagnetic wave power irradiated from the portable telephone 3 as the mobile station to another electronic equipment can be reliably prevented in the specific area.

Also, according to the present invention, because the use limitation can be automatically performed only in the area where the use of the portable telephone should be limited, nuisance to people by the user can be prevented in a public area.

In addition, if it is displayed on the display section that the portable telephone is outside of the service area, the use limitation can be performed without inconvenience to the user.

What is claimed is:

1. A mobile station use limiting system comprising:
    a base station provided in a respective cell and connected to a public telephone network;
    a use limiting station provided in the respective cell, for transmitting a use limitation signal; and
    a mobile station capable of communication with said base station with electromagnetic wave, wherein the communication via an said base station is limited in said mobile station in response to the use limitation signal.

2. A mobile station use limiting system comprising:
    a base station provided in a respective cell and connected to a public telephone network;
    a use limiting station provided in the respective cell for transmitting a use limitation signal; and
    a mobile station capable of communication with said base station via an electromagnetic wave, wherein the communication with said base station is limited in said mobile station in response to the use limitation signal, wherein said mobile station comprises:
        a communication section for communicating with said base station;
        a receiving section for receiving the use limitation signal from said use limiting station; and
        a control section for controlling said communication section in response to the reception of the use limitation signal to prohibit the communication with said base station.

3. A mobile station use limiting system according to claim 2, wherein said mobile station further comprises a display section, and
    wherein said control section includes:
        a message storing section for storing a message indicating that said mobile station is in a communication prohibited area where the use limitation signal can be received; and
        a section for displaying the message on said display section in response to the reception of the use limitation signal.

4. A mobile station use limiting system according to claim 2, wherein said control section includes a first section responsive to the reception of the use limitation signal, for controlling said communication section to issue to said base station a reception limitation notice indicating that said mobile station is in a communication prohibited area where the use limitation signal can be received.

5. A mobile station use limiting system according to claim 4, wherein said base station stops relay of a call to said mobile station in response to the reception limitation notice.

6. A mobile station use limiting system according to claim 4, wherein said control section includes a second section responsive to no reception of the use limitation signal, for controlling said communication section to issue to said base station a reception enable notice indicating that said mobile station is out of the communication prohibited area, when the use limitation signal is not received after the use limitation signal is once received.

7. A portable telephone comprising:
    a communication section for communicating with a first external apparatus via an electromagnetic wave;
    a receiving section for externally receiving a use limitation signal from a second external apparatus;
    a control section for controlling said communication section in response to the reception of the use limitation signal to prohibit the communication with the first external apparatus.

8. A portable telephone according to claim 7, wherein said portable telephone further comprises a display section, and
    wherein said control section includes:
        a message storing section for storing a message indicating that said mobile station is in a communication prohibited area where the use limitation signal can be received; and
        a section for displaying the message on said display section in response to the reception of the use limitation signal.

9. A portable telephone according to claim 8, wherein said control section includes a section responsive to the reception of the use limitation signal, for controlling said communication section to issue a reception limitation notice to the first external apparatus indicating that said mobile station is in a communication prohibited area where the use limitation signal can be received.

10. A portable telephone according to claim 9, wherein said control section includes a section responsive to no reception of the use limitation signal, for controlling said communication section to issue a reception enable notice to the first external apparatus indicating that said mobile station is out of the communication prohibited area, when the use limitation signal is not received after the use limitation signal is once received.

11. A communication control method in a mobile station use limiting system comprising the steps of:
    transmitting a use limitation signal from a use limiting station which is provided in a respective cell;
    allowing communicating between a base station and a mobile station while the mobile station is not in a use limitation area in the respective cell corresponding to the base station where the use limitation signal can be received by the mobile station, the base station covering the cell;

prohibiting the communication between the mobile station and the base station while the mobile station is in the use limitation area.

12. A communication control method in a mobile station use limiting system comprising the steps of:

transmitting a use limitation signal from a use limiting station which is provided in a respective cell;

allowing communicating between a base station and a mobile station while the mobile station is not in a use limitation area in the respective cell corresponding to the base station where the use limitation signal can be received by the mobile station, the base station covering the cell; and prohibiting the communication between the mobile station and the base station while the mobile station is in the use limitation area, wherein said prohibiting step includes issuing a use prohibited notice from the mobile station to the base station when the mobile station enters the use limitation area.

13. A communication control method according to claim 12, wherein said prohibiting step includes issuing a use enabling notice from the mobile station to the base station when the mobile station goes out of the use limitation area.

14. A communication control method according to claim 11, wherein said prohibiting step includes:

prohibiting transmission of a call from the base station to the mobile station; and prohibiting transmission of a call from the portable telephone to the base station.

15. A communication control method in a mobile station use limiting system comprising the steps of:

transmitting a use limitation signal from a use limiting station which is provided in a respective cell;

allowing communicating between a base station and a mobile station while the mobile station is not in a use limitation area in the respective cell corresponding to the base station where the use limitation signal can be received by the mobile station, the base station covering the cell; and prohibiting the communication between the mobile station and the base station while the mobile station is in the use limitation area, wherein said prohibiting step includes:

prohibiting transmission of a call from the base station to the mobile station; and prohibiting transmission of a call from the portable telephone to the base station, wherein said prohibiting step includes displaying a message indicating that the mobile station is in the use limitation area.

16. A mobile station use limiting system comprising:

a base station provided in a respective limited geographical cell and connected to a telephone network;

a use limiting station provided in the respective limited geographical cell, said use limiting station transmitting a use limitation signal in a further limited geographical area within the limited geographical cell;

a mobile station capable of communication with said base station via an electromagnetic wave, wherein communication with the base station is prohibited between said mobile station and said base station when said mobile station receives said use limitation signal.

17. The mobile station use limiting system according to claim 16, wherein said mobile station comprises:

a communication section for communicating with said base station;

a receiving station for receiving the use limitation signal from said use limiting station; and a control section responsive to receipt of said use limitation signal, for controlling said communication section to issue to said base station a reception limitation notice indicating that said mobile station is in said further limited geographical area where the use limitation signal can be received.

18. The mobile station use limiting system according to claim 16, wherein the use limiting station outputs said use limitation signal at a fraction of the power necessary for communication between said base station and said mobile station.

19. The mobile station use limiting system according to claim 18, wherein the use limiting station outputs said use limitation signal, said use limitation signal having a power on an order of milliwatts.

20. The mobile station use limiting system according to claim 16, wherein the use limiting station outputs said use limitation signal, said use limitation signal being an infrared signal.

* * * * *

UNITED STATES PATENT AND TRADEMARK OFFICE
CERTIFICATE OF CORRECTION

PATENT NO.: 6,052,577
DATED: April 18, 2000
INVENTOR(S): Masayuki TAGUCHI

It is certified that error(s) appears in the above-identified patent and that said Letters Patent is hereby corrected as shown below:

Column 4, line 54 delete "with replies" insert --replies with-- line 66 delete "261" insert --26-1--

Signed and Sealed this

Tenth Day of April, 2001

Attest:

NICHOLAS P. GODICI

*Attesting Officer*  *Acting Director of the United States Patent and Trademark Office*